US012712660B2

(12) United States Patent
Jain et al.

(10) Patent No.: US 12,712,660 B2
(45) Date of Patent: Aug. 18, 2026

(54) DISRUPTING CONNECTIONS BETWEEN ROGUE ACCESS POINTS AND ROGUE STATIONS WITH SPOOFED BSS TRANSITION MANAGEMENT REQUEST FRAMES

(71) Applicant: Fortinet, Inc., Sunnyvale, CA (US)

(72) Inventors: Ankur Jain, Bangalore (IN); Ruchir Mishra, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 349 days.

(21) Appl. No.: 18/542,285

(22) Filed: Dec. 15, 2023

(65) Prior Publication Data

US 2025/0202615 A1 Jun. 19, 2025

(51) Int. Cl.
*H04K 3/00* (2006.01)
*H04W 12/122* (2021.01)

(52) U.S. Cl.
CPC ................ *H04K 3/65* (2013.01); *H04K 3/62* (2013.01); *H04W 12/122* (2021.01)

(58) Field of Classification Search
CPC .................................................. H04W 12/122
See application file for complete search history.

(56) References Cited

U.S. PATENT DOCUMENTS

| | | | | |
|---|---|---|---|---|
| 2005/0018674 | A1* | 1/2005 | Dropps | H04L 49/357 370/389 |
| 2005/0171720 | A1* | 8/2005 | Olson | H04W 12/122 702/121 |
| 2010/0296496 | A1* | 11/2010 | Sinha | H04W 12/12 370/338 |
| 2015/0036539 | A1* | 2/2015 | Townend | H04W 84/18 370/254 |
| 2015/0189511 | A1* | 7/2015 | Lapidous | H04L 63/0272 726/15 |
| 2023/0276239 | A1* | 8/2023 | Saloni | H04W 12/122 370/329 |
| 2023/0319943 | A1* | 10/2023 | Barton | H04W 76/25 370/338 |
| 2023/0422118 | A1* | 12/2023 | Deshmukh | H04W 36/00833 |

* cited by examiner

*Primary Examiner* — Wen W Huang
(74) *Attorney, Agent, or Firm* — Law Office of Dorian Cartwright; Dorian Cartwright

(57) ABSTRACT

A Wi-Fi controller identifies a rogue access point from AP scan reports and a rogue station from station scan reports. A connection between the rogue station and the rogue access point is disrupted by notifying a nearby, trusted access point to transmit a spoofed Basic Service Set (BSS) Transition Management Request (BTM-REQ frame) Action frame. In response, the trusted access point generates the frame spoofed with a Preference field value for a rogue BSSID set to a lowest value under a Subelement: BSS Transition Candidate Preference field, and also spoofed having a Preference field value for a trusted BSSID set to a highest value, and further spoofed with the Disassociation Imminent field value is set to 1 indicative of upcoming disconnection.

20 Claims, 9 Drawing Sheets

WI-FI CONTROLLER
110

Access Point Module
210

Station Module
220

Rogue Device Detector
230

Rogue Device Disruptor
240

FIG. 2

Figure 3B:
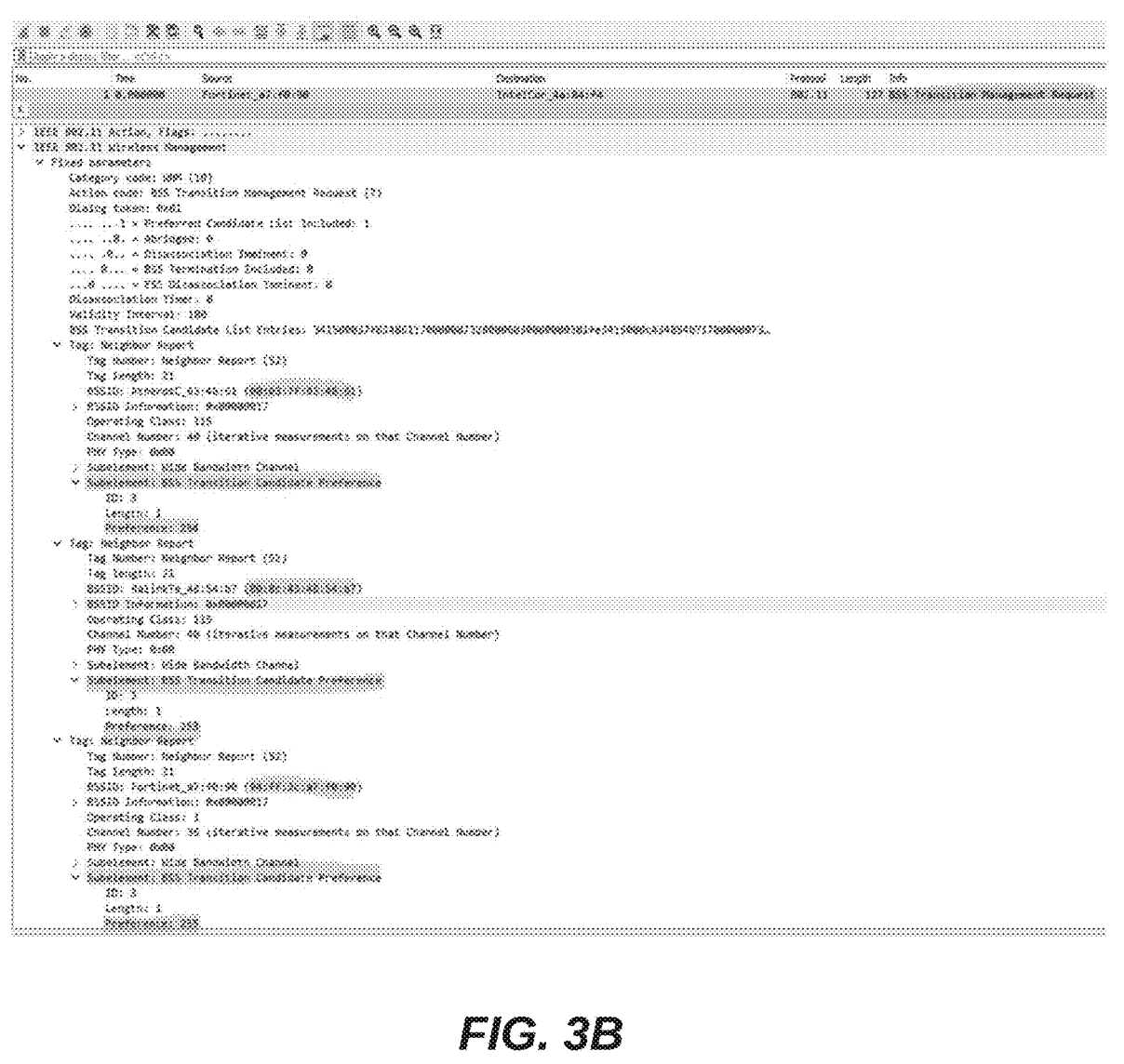

```
No.    Time       Source               Destination          Protocol  Length  Info
     1 0.000000   Fortinet_a7:40:90    IntelCor_4e:84:f4    802.11    127     BSS Transition Management Request

> IEEE 802.11 Action, Flags: ........
v IEEE 802.11 Wireless Management
  v Fixed parameters
      Category code: WNM (10)
      Action code: BSS Transition Management Request (7)
      Dialog token: 0x01
      .... ...1 = Preferred Candidate List Included: 1
      .... ..0. = Abridged: 0
      .... .0.. = Disassociation Imminent: 0
      .... 0... = BSS Termination Included: 0
      ...0 .... = ESS Disassociation Imminent: 0
      Disassociation Timer: 0
      Validity Interval: 100
      BSS Transition Candidate List Entries: [illegible]
    v Tag: Neighbor Report
        Tag Number: Neighbor Report (52)
        Tag length: 21
        BSSID: [illegible]
      > BSSID Information: [illegible]
        Operating Class: 115
        Channel Number: 40 (iterative measurements on that Channel Number)
        PHY Type: 0x00
      > Subelement: Wide Bandwidth Channel
      v Subelement: BSS Transition Candidate Preference
          ID: 3
          Length: 1
          Preference: 255
    v Tag: Neighbor Report
        Tag Number: Neighbor Report (52)
        Tag length: 21
        BSSID: [illegible]
      > BSSID Information: [illegible]
        Operating Class: 115
        Channel Number: 48 (iterative measurements on that Channel Number)
        PHY Type: 0x00
      > Subelement: Wide Bandwidth Channel
      v Subelement: BSS Transition Candidate Preference
          ID: 3
          Length: 1
          Preference: [illegible]
    v Tag: Neighbor Report
        Tag Number: Neighbor Report (52)
        Tag length: 21
        BSSID: Fortinet_a7:40:90 [illegible]
      > BSSID Information: [illegible]
        Operating Class: 1
        Channel Number: 36 (iterative measurements on that Channel Number)
        PHY Type: 0x00
      > Subelement: Wide Bandwidth Channel
      v Subelement: BSS Transition Candidate Preference
          ID: 3
          Length: 1
          Preference: [illegible]
```

DISRUPTING CONNECTIONS BETWEEN ROGUE ACCESS POINTS AND ROGUE STATIONS WITH SPOOFED BSS TRANSITION MANAGEMENT REQUEST FRAMES

FIELD OF THE INVENTION

The invention relates generally to computer networks, and more specifically, for disrupting connections between rouge access points and rogue stations operating with spoofed Basic Service Set (BSS) Transition Management Request (BTM-REQ) Action frames.

BACKGROUND

Enterprise wireless networks have different means to detect and mitigate rogue access points. In general, rogue access points can convince stations to connect by pretending to be part of the trusted network. For example, in the university or airport scenario, with may BYOD devices, rogue access points can perform man-in-the-middle attacks, converting confidential information, on unsuspecting stations.

To defend against rogue access points, trusted access points can trasmit Deauth frames (with rogue BSSID) on the same channel, causing a Deauth at the rogue station by interrupting it's L2/L3 connection with the rogue access point. While this can be utilized in 2.4 GHz and 5 GHz with lower channel counts, the 59 channel count of 6 GHz makes monitoring harder with so many more channels to scan. Furthermore, when a station with Windows or another operating system are configured to auto reconnect, even after multiple Deauth disconnections, a reconnection can follow. Hence, the station reconnects back and again resumes data traffic. Consequently, the enterprise network remains vulnerable to malicious malware and phishing attacks.

What is needed is a robust technique for disrupting connections between rouge access points and rogue stations operating with spoofed Basic Service Set (BSS) Transition Management Request (BTM-REQ) Action frames.

SUMMARY

To meet the above-described needs, methods, computer program products, and systems for disrupting connections between rouge access points and rogue stations operating with spoofed BSS transition management request frames.

In one embodiment, AP scan reports and station scan reports are received at a Wi-Fi controller from one or more access points. In turn, a rogue access point from the access point scan reports and a rogue station from the station scan reports. The rogue station and the rogue access point are compatible with IEEE 802.11v, in some cases.

In another embodiment, a rogue station connection to the rogue access point is disrupted by notifying a nearby, trusted access point to transmit a spoofed BTM-REQ Action frame. In response, the trusted access point generates the frame spoofed with a Preference field value for a rogue BSSID set to a lowest value under a Subelement: BSS Transition Candidate Preference field, and also spoofed having a Preference field value for a trusted BSSID set to a highest value, and further spoofed with the Disassociation Imminent field value is set to 1 indicative of upcoming disconnection. The nearby, trusted access point is compatible with IEEE 802.11v, in some cases.

In still another embodiment, disruption of the connection between the rogue station and the rogue BSSID is detected from subsequent station scan.

Advantageously, network performance is improved with better security from rogue network devices.

BRIEF DESCRIPTION OF THE DRAWINGS

In the following drawings, like reference numbers are used to refer to like elements. Although the following figures depict various examples of the invention, the invention is not limited to the examples depicted in the figures.

Figure 2:
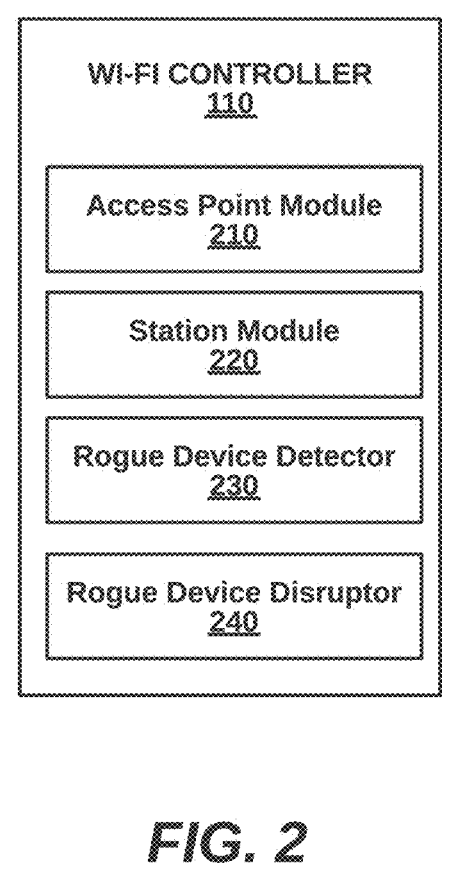

FIG. 2 is a more detailed block diagram illustrating a Wi-Fi controller of the system of FIG. 1, according to one embodiment.

FIGS. 3A-3D are more detailed tables illustrating frames associated with disruption techniques, according to one embodiment.

DETAILED DESCRIPTION

Methods, computer program products, and systems for disrupting connections between rouge access points and rogue stations operating with spoofed station transition frames (e.g., a BTM-REQ Action frame). The following disclosure is limited only for the purpose of conciseness, as one of ordinary skill in the art will recognize additional embodiments given the ones described herein. For example, a spoofed BSS transition management request frame is cited as an example throughout the disclosure, although modified frames can be substituted.

I. Systems for Disrupting Rogue Network Access Point Connections (FIGS. 1-3)

Figure 1:
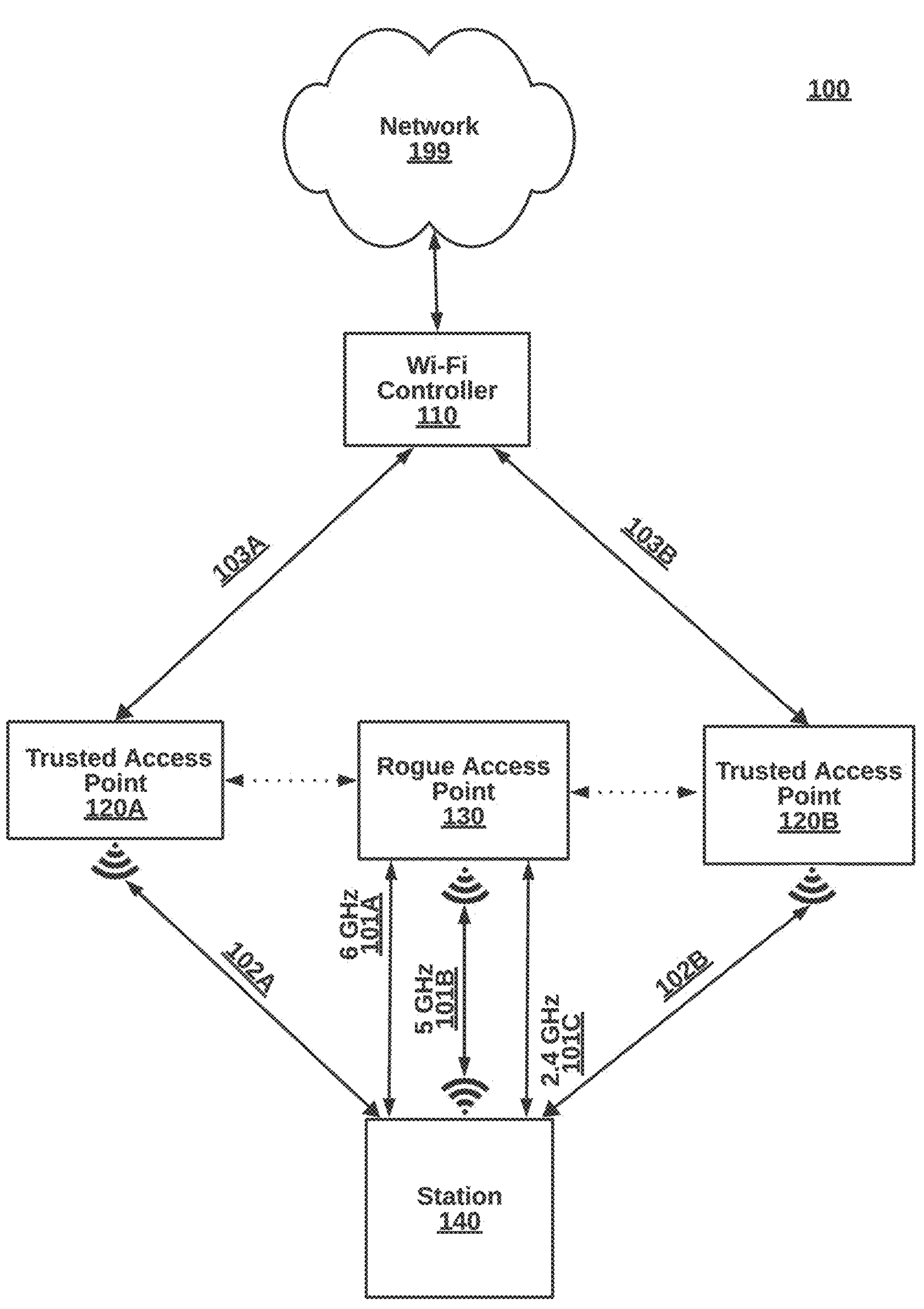
FIG. 1 is a high-level block diagram illustrating aspects of a system coordinating for disrupting connections between rouge access points and rogue stations operating with spoofed BSS transition management request frames, according to some embodiments.
Figure 6:
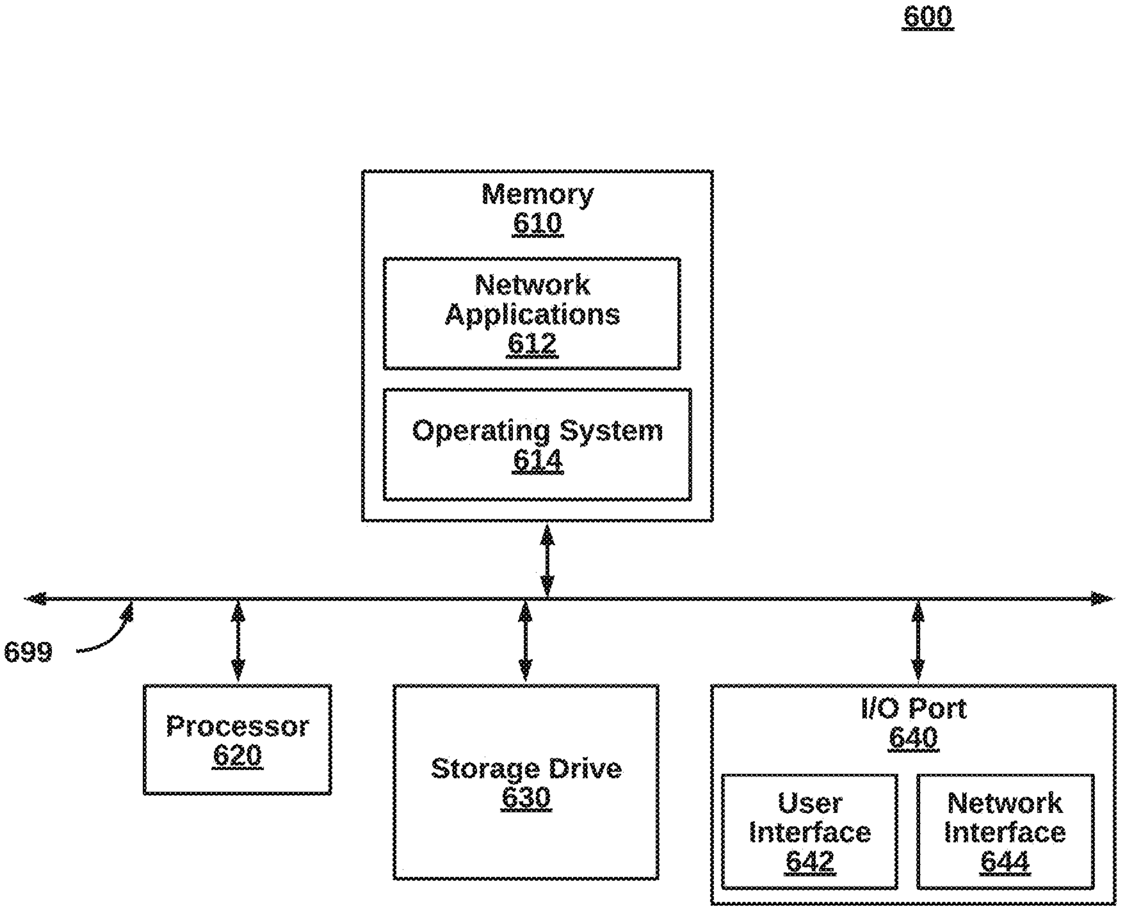
FIG. 6 is a block diagram illustrating an example computing device for the system of FIG. 1, according to one embodiment.

FIG. 1 is a high-level block diagram illustrating a system 100 for disrupting connections between rouge access points and rogue stations operating with spoofed BSS transition management request frames, according to an embodiment. The system 100 includes a Wi-Fi controller 110, trusted access points 120A,B, rogue access point 130 and rogue station 140. Other embodiments of the system 100 can include additional components that are not shown in FIG. 1, such as routers, switches, network gateways, RADIUS servers, and firewalls, as well as additional access points and stations (e.g., IEEE 802.11v stations, non IEEE 802.11v stations, future protocol stations, and legacy protocol stations) are also possible. For example, the system 100 of FIG. 1 shows one station and three access points, however, other examples have hundreds of stations connected to access points distributed over different LANs. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., Wi-Fi controller 110 and access points 120, 120B, 130). The components can also be connected via wireless networking (e.g., station 140). The rogue access point 130 is communicatively coupled wirelessly to the station 140 via multiple wireless links 101A, 101B, 101C that can simultaneously transmit. The station 140 can alternatively be communicatively coupled to one or more links 102A to trusted access point 120A and also via one or more links 102B to trusted access point 120B. In some cases, the station 140 has one link coupled to trusted access point 120A and another link coupled to rogue access point 130. N turn, the trusted access points 120A, 120B are communicatively coupled by hardware to Wi-Fi controller 110, and by wireless to rogue access point 130. The data communication network 199 can be composed of any combination of hybrid networks, such as an SDWAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or IPv6 address spaces.

One embodiment of the system 100 in operation is described in the following steps, as a non-limiting example:

Radios of tri-band access points can serve different purposes: R1: Service Mode, Scanning radio (can perform background scan); R2: Service Mode, Scanning radio (can perform background scan); and R3: Dedicated Monitor mode, Wireless Intrusion Detection System (WIDS) radio (can perform foreground scan). In a background scan, the radio in service mode serves a transitional period between service mode and scanning mode. In a foreground scan, the radio is in dedicated monitor mode and continues to perform continuous scan on all bands (2.4 GHz, 5 GHz, 6 GHz).

In a time-slice scenario, once a WIDS radio scanning on a particular channel (e.g., channel 36) determines the presence of a rogue station connected to a third-party rogue access point, it starts sending Deauth's (i.e., unicast and/or broadcast) until the time it's presently scanning in that particular channel (e.g., channel 36). But the access point cannot continuously do that, as it has to scan on other channels as well to determine the presence of new rogue devices). Hence, typically for 100 ms duration only a Scanning/WIDS-radio can send Deauth's to the rogue-station, after which it'll have to move to next channels for repeating the same scan process and return back to channel 36 after completing all other 5 GHz channels scan.

During this time, the rogue station can reconnect and start transmission again over channel 36. Performance of other connected clients can be impacted, if the above activity continues for a long time. This situation can still be fine for 2.4 GHz band with only few channels (e.g., 11 channels) to scan, but the number of channels elevates in 5 GHz band (e.g., 25 channels). Of highest consequence is in 6 GHz, where there are far more channels to be scanned (e.g., 59 channels).

One mechanism for overcoming the reconnection problem is A. a spoofed Solicited BTM Request frame via unicast; another mechanism is B. a Spoofed Unsolicited BSS Transition Management Request frame via unicast; and yet another mechanism is C. a Spoofed Unsolicited BTM Request frame via broadcast.

A. First, a Solicited BTM Request frame via unicast starts when the WIDS radio of trusted a access point detects and reports to a Wi-Fi controller the presence of rogue access point BSSIDs in the vicinity. An Organizationally Unique Identifier (OUI) match process will run, in some embodiments, to confirm that the scanned BSSID (e.g., generated from AP scan report) does not belong to the enterprise and hence should be suppressed.

Once the WIDS radio has identified the station MAC address, a rogue access point SSID and a rogue access point BSSID, it will capture and inspect the IEEE 802.11v frame exchanges between the rogue access point and the rogue station (e.g., BTM Query frame from station to rogue access point, and BTM Request frame from rogue access point to rogue station).

In one embodiment, a Preference field under Subelement: BSS Transition Candidate Preference of the spoofed BSS Transition Management Request frame sent by the WIDS radio will be set to value=0, wherein 0 stands for lowest preference and 255 stands for highest preference. When this spoofed frame, with lowest preference=0 set for the rogue BSSID is listened and processed by the rogue-station connected to rogue access point, it'll immediately determine that it's connected access point is informing that it's respective BSSID is of least, no, or zero preference, and this will make the station look for other options.

At this time, from the WIDS radio scan report, the Wi-Fi controller will determine the nearest placed trusted access point WIDS radio (in the vicinity of rogue access point) and instruct the respective WIDS radio to add it's available BSSID field in the upcoming BTM Request frame for transmission. Before transmitting a spoofed BTM-REQ Action frame (on the same channel, as that of rogue access point's operating channel), the trusted access point will add its own BSSID under Subelement: BSS Transition Candidate Preference setting its native BSSID with the highest preference value (i.e., 255) as an attempt to get the rogue station connect on authorized access point BSSID.

When such a unicast solicited BTM-REQ Action frame is heard by the rogue station connected to the rogue access point, preferably the rogue station will determine that it's connected BSSID has the least preference, while another BSSID (i.e., broadcasted by trusted access point) has the highest preference. In such a situation, rogue station is steered to the preferred BSSID.

Figure 3A:

In another embodiment, as shown in FIG. 3A, a Disassociation Imminent field is set to 1 and a Disassociation Timer is set to 200 ms (or 20 ms or any other appropriate value). One of ordinary skill in the art will recognize that many other variations are possible. As soon as the rogue station processes the above IE-fields, it's understood that the current connection with rogue access point is going to get disrupted in 200 ms and it must move its operations. This step is forcibly going to disrupt any existing connection between rogue station and rogue access point. After which the station can try authenticating with the high-preference trusted access point BSSID, if not continue to remain in an unconnected state.

B. For Unsolicited BTM Request frame via unicast, in this case the WIDS radio needs to capture an IEEE 802.11v BSS transition management frame exchange between a rogue access point and a rogue station. From the information available via #stascan. The WIDS radio creates a spoofed unsolicited BTM Request frame, without first receiving an upstream BTM Query frame from the rogue station. The Preference field under Subelement: BSS Transition Candidate Preference is set to value=0, as shown in FIG. 3B. This will disrupt the current connection and also prevent future reconnections to the same rogue SSID again, as the respective BSSID is set to lowest preference.

C. For Unsolicited BTM Request frame via broadcast can be sent as a broadcast frame across multiple channels by WIDS radio in DM mode. Enabling all 802.11v enabled stations, update their internal tables with the info that the rogue access point BSSID preference is 0*Elaboration of above stated steps (a) to (d); and hence they need-not to initiate a connection (or Assoc-REQ frame) to the respective rogue BSSID Hereby, preventing the stations from joining a rogue-network!

In a deployment without support for IEEE 802.11AX or a deployment with IEEE 802.1111v being disabled, the disruption technique uses IEEE 802.11k Neighbor Reports. In more detail, station sends out a Neighbor Report Request frame to its connected access point.

Figure 3C:
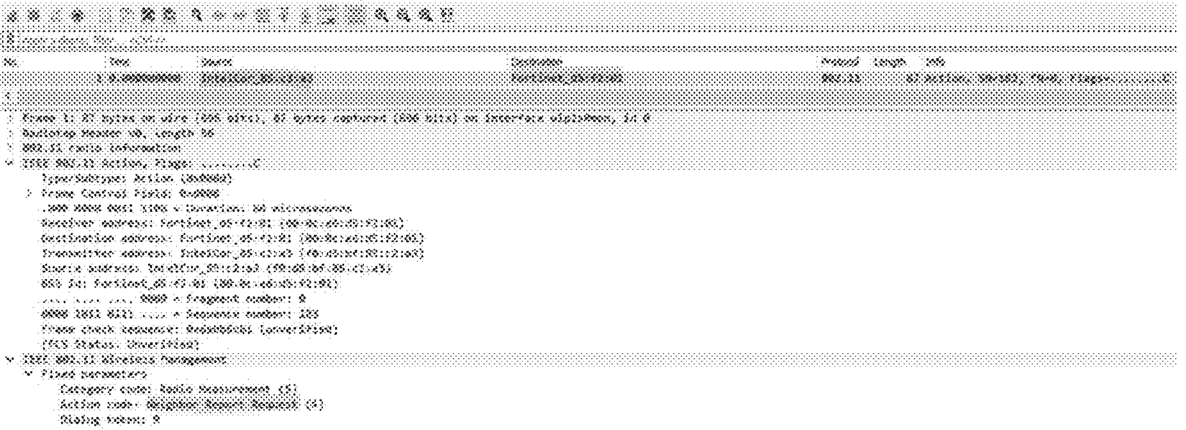
Figure 3D:
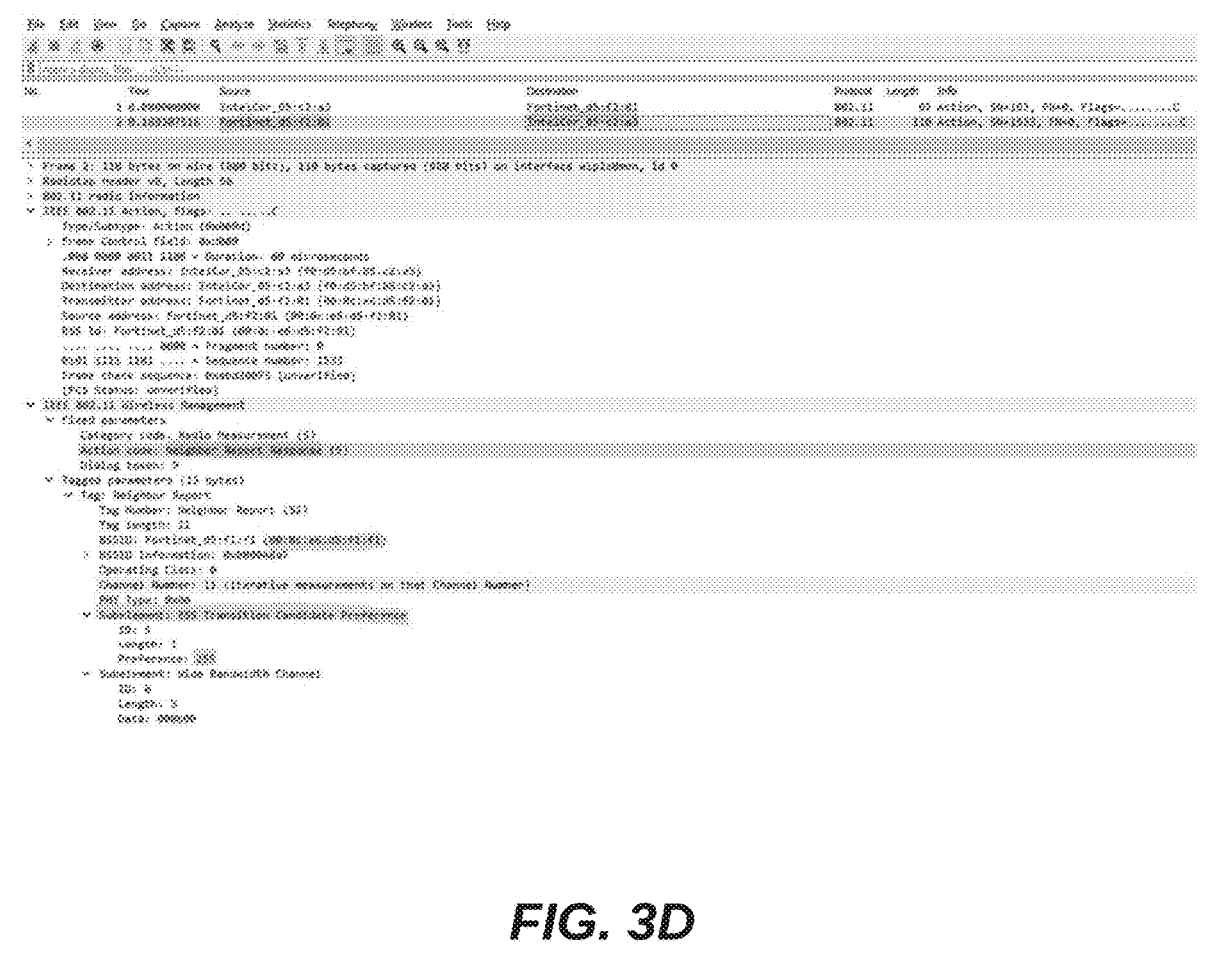

As indicated in the above FIG. 3C, WIDS radio can know when the rogue station has initiated this Neighbor Report Request frame, for asking it's connected rogue access point to share the neighbor BSSID reports. In response, the trusted radio sends out a spoofed Neighbor Report Response frame as shown in FIG. 3D. With the minimum/zero preference set for the rogue BSSID, hereby letting the rogue-station know that it's connected rogue access point BSSID's neighbor report is giving it an indication that's rogue BSSID's preference is lowest, WIDS radio can also transmit another Neighbor Report Request Frame with the trusted access point BSSID preference set to 255 (maximum). Eventually making the rogue station believe that the highest-preference BSSID (of the trusted access point) is the best option to send out a connection request.

The Wi-Fi controller 110 manages connection disruptions, from a central point of view, by coordinating the the access points. AP scan reports and sta scan reports are submitted by the access points periodically. The Wi-Fi controller 110 processes this information to identify rogue devices and to devise a response via the access points.

The trusted access points 120A, 120B and the rogue access points 130 can each operate generally as an access point. However, the rogue access point 130 is not authorized by the enterprise network, hence the label rogue. In some cases, the trusted access points 120A, 120B have different OUIs or vendor identifications. Some rogue access points are malicious and others, although without malicious intent, can degrade security of the enterprise network.

The trusted access points 120A, 120B each provide a local view of data that is aggregated by the Wi-Fi controller 110 for a network-wide view. Access point scan reports (or neighbor reports) are generated by listening to other data traffic within RF range of an access point, although not designated for the snooping access point. A parser exposes meta data indicating a BSSID an operating channel of a nearby access point. RSSI values of different data packets associated with the same snooped access point can help in estimating a location or distance away from another access point.

A station status report can also be compiled from snooping data packets, in addition to listing the connected stations. Data packets received from access points and stations are measured for an RSSI value. Stations, along with MAC address, IP address, and the like, are listed in the station status report, transmitted upstream to the Wi-Fi controller 110 by each of the access points 120A, 120B.

The access points 120A, 120B, upon direction of the Wi-Fi access point 110, generate a BTM-Action Req frame to proactively provide BSS roaming data to the station 140, without having to compile a BTM-Query frame (see FIG. 3A). One embodiment sets a value for an imminent disassociation field to indicate that the station 140 will be forcibly removed from receiving network service, and therefore, the station 140 is compelled to immediately roam to continue a network connection. Another embodiment further provides a preferred list of BSSID for service. Conventionally, neighbor reports are not provided until requested by the station 140.

A tri-band access point may also transmit traffic at a legacy data rate in order to guarantee that every device connected to the SSID receives it. The initial 802.11abg speeds of 1, 2, 5.5, 6, 9, 11, 12, 18, 24, 36, 48, and 54 Mbps are considered the legacy data rates.

This reduces the amount of bandwidth available to other users and raises channel contention. However, this action is required by the 802.11 standard, in one embodiment, in order to support backwards compatibility. These lower-order modulation transmissions take up more space in the medium and interfere with the efficient delivery of traffic to neighboring stations.

The station 140 connects to nearby access points over wireless channels for uploading and downloading data from the data communication network. The same station can be referred to as a rogue station while connected to a rogue access point, and also be referred to as a trusted station while connected to a trusted access point. The station 140 can have an operating system with an auto-reconnect option being active, so that disconnections from a current access point are quickly remediated. In many other embodiments of network architectures, there are many stations, such as four or hundreds of them.

From time-to-time, the station 140 roams from one access point to a different access point (e.g., from the access point 120A to the access point 120B, or unfortunately, from the access point 120A to the rogue access point 130), often due to a better RSSI signal being available. The BTM-REQ Action frame provides preferred BSSIDs to join and non-preferred BSSIDs to stay away from, to help steer the station 140. The station 140 comprises hardware-based transceivers and antennae that can send and receive signals over a wireless channel. Some embodiments transmit simultaneously over multiple links to the same access point or to different access points. For example, the station can communicate over two different radio channels in wireless exchanges with the rogue access point 130. First, the components can communicate over line 101A for 5 GHz transmissions and simultaneously over line 101B for 6 GHz transmissions. Alternatively, the components can communicate over line 101A for 5 GHz and simultaneously over line 101C for 2.4 GHz transmissions. Furthermore, the components can communicate over line 1012, with the access point 120B.

In some embodiments, the station 140 receives a BTM-REQ Action frame from the trusted access point 120A. In response, the station 140 selects a new access point from the at least one preferred access points of the BTM-REQ Action frame and an internal RSSI scan table comprising RSSI values with respect to the at least one preferred access points. Then the station 140 transmits a BTM-RES frame to notify the access point 120A of its current connection, of upcoming BSS fast transition in connections to a selected one of the at least one preferred access point. If the station is known to the enterprise network, it may join a trusted access point, otherwise, it may not have any connection options.

FIG. 2 is a more detailed block diagram illustrating the Wi-Fi controller 110 of the system of FIG. 1, according to one embodiment. The Wi-Fi controller 110 includes an access point module 210, a station module 220, a rogue device detector 230 and a rogue device disruptor 240. The components can be implemented in hardware, software, or a combination of both.

The access point module 210, in an embodiment, receives AP scan reports and station scan reports from one or more access points. An access point table can be generated to track, for each access point, nearby access points and nearby stations. Also, instructions can be sent out to the access points for disrupting rogue connections.

The station module 220 can also process AP scan reports and station scan reports, from the station perspective. In more detail, a station table can be generated to track, for each station, characteristics of the station and RSSI values for the station relative to nearby access points.

The rogue device detector 230 is configured to identify a rogue access point from the access point scan reports and a rogue station from the station scan reports. The rogue station and the rogue access point are compatible with IEEE 802.11v, in an embodiment. The rogue device detector identifies disruption of the connection (or reconnection) between the rogue station and the rogue BSSID from subsequent station scan reports.

The rogue device disruptor 240 can disrupt the rogue station connection to the rogue access point by notifying a nearby, trusted access point to transmit a spoofed BTM-REQ Action frame. The frame is generated with a Preference field value for a rogue BSSID set to a lowest value under a Subelement: BSS Transition Candidate Preference field, and with a Preference field value for a trusted BSSID set to a highest value. The Disassociation Imminent field value is set to 1 indicative of upcoming disconnection. The nearby trusted access point is compatible with IEEE 802.11v.

II. Methods for Disrupting Rogue Network Access Point Connections (FIGS. 4-5)

Figure 4:
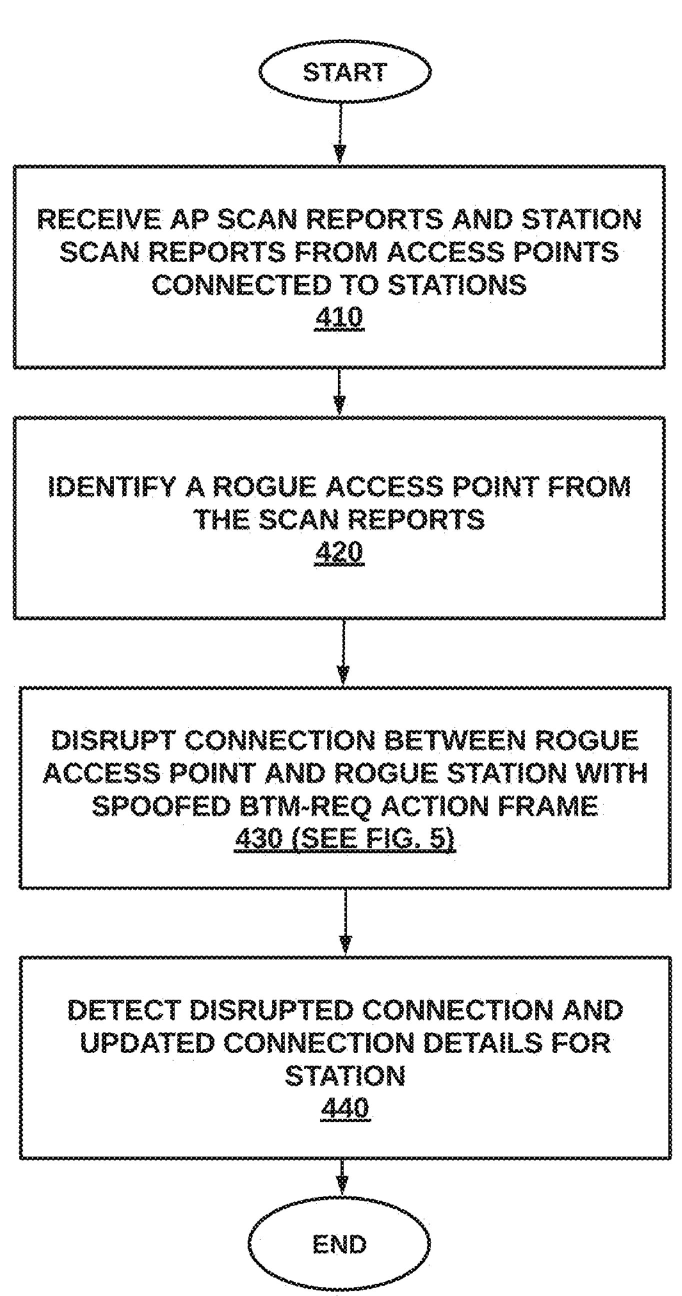
FIG. 4 is a high-level flow diagram illustrating a method for securing against rogue network devices, according to an embodiment.
Figure 5:
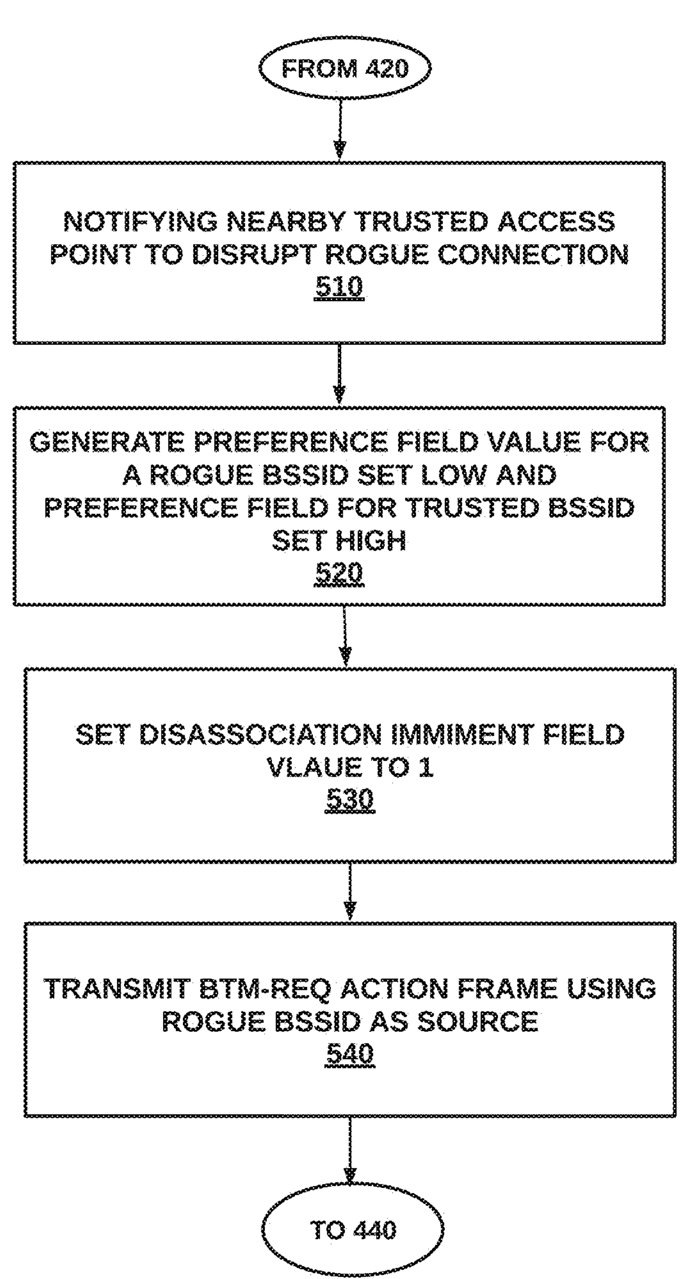
FIG. 5 is a more detailed flow diagram illustrating a step for disrupting connections between rouge access points and rogue stations operating with spoofed BSS transition management request frames, from the method of FIG. 4, according to one embodiment.

FIG. 4 is a high-level flow diagram of a method 400 for securing against rogue network devices in 6 GHz, according to an embodiment. The method 400 can be implemented by, for example, system 100 of FIG. 1. The specific grouping of functionalities and order of steps are a mere example as many other variations of method 400 are possible, within the spirit of the present disclosure. In some implementations, the method 400 works in cooperation with other network security techniques, such as Deauth frames.

Specifically, at step 410, AP scan reports and station scan reports are received from one or more access points. At step 420, a rogue access point from the access point scan reports and a rogue station from the station scan reports. The rogue station and the rogue access point are compatible with IEEE 802.11v.

At step 430, the connection between the rogue station and the rogue access point are disrupted, as described further below in association with FIG. 5. At step 440, the disrupted connection (or reconnection) between the rogue station and the rogue BSSID can be detected from subsequent station scan.

Turning to FIG. 5, a more detailed flow diagram is shown detailing the step 430 of disrupting the connection between the rogue station and the rogue access point. Other variations are possible for different implementations.

At step 510, disruption of the rogue station connection to the rogue access point is initiated, in one implementation, by a Wi-Fi controller notifying a nearby, trusted access point to transmit a spoofed BTM-REQ Action frame. The nearby, trusted access point is compatible with IEEE 802.11v, in some embodiments.

At step 520, the frame is generated with a Preference field value for a rogue BSSID is set to a lowest value under a Subelement: BSS Transition Candidate Preference field, and a Preference field value for a trusted BSSID is set to a highest value. At step 530, the Disassociation Imminent field value is set to 1 (or other low value), indicative of an upcoming disconnection. At step 540, the trusted access point transmits the spoofed BTM-REQ Action frame to the rogue station.

III. Computing Device for Disrupting Rogue Network Access Point Connections (FIG. 6)

FIG. 6 is a block diagram illustrating a computing device 600 for use in the system 100 of FIG. 1, according to one embodiment. The computing device 600 is a non-limiting example device for implementing each of the components of the system 100, including the Wi-Fi controller 110, the Wi-Fi access points 120A, 120B, 130 and the station 140. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a Wi-Fi controller on a data communication network, for disrupting connections between rouge access points and rogue stations operating with spoofed Basic Service Set (BSS) Transition Management Request (BTM-REQ frame) Action frames, the method comprising:

receiving, at the Wi-Fi controller, AP scan reports and station scan reports from one or more access points;

identifying a rogue access point from the access point scan reports and a rogue station from the station scan reports, wherein the rogue station and the rogue access point are compatible with IEEE 802.11v;

disrupting the rogue station connection to the rogue access point by notifying a nearby, trusted access point to transmit a spoofed BTM-REQ Action frame, having a Preference field value for a rogue BSSID set to a lowest value under a Subelement: BSS Transition Candidate Preference field, and having a Preference field value for a trusted BSSID set to a highest value, wherein the Disassociation Imminent field value is set to 1 indicative of upcoming disconnection, and wherein the nearby trusted access point is compatible with IEEE 802.11v; and detecting disruption of the connection between the rogue station and the rogue BSSID from subsequent station scan reports;

wherein a second rogue station does not support IEEE 802.11v, disrupting the connection to the rogue access point by notifying a nearby, trusted access point to transmit a spoofed Action frame, wherein a Preference field value is set to a lowest value for a rogue BSSID under Subelement: BSS Transition Candidate Preference, wherein a Preference field value for a trusted BSSID is set to a highest value.

2. The method of claim 1, further comprising identifying reconnection to rogue BSSID, and in response, broadcasting the spoofed BTM-REQ Action frame.

3. The method of claim 1, further comprising identifying a threshold number of rogue stations connected to the same rogue access point, and in response, broadcasting the spoofed BTM-REQ Action frame, wherein a second rogue station avoids any future connection by the second rogue station to the rogue access point.

4. The method of claim 1, further comprising identifying a threshold number of rogue stations potentially connecting to the same rogue access point, and in response, broadcasting the spoofed BTM-REQ Action frame, wherein a second rogue station avoids any future connection by the second rogue station to the rogue access point.

5. The method of claim 1, wherein the step of identifying the access point with an OUI comparison.

6. The method of claim 1, wherein the BTM-REQ Action frame a Disassociation Time field is set to a relatively low value.

7. The method of claim 1, further comprising detecting the rogue station and the rogue access point comprises detecting a Wi-Fi 6E rogue station and a Wi-Fi 6E access point.

8. The method of claim 1, wherein the spoofed BTM-REQ Action frame comprises a solicited BTM-REQ Action frame transmitted by the nearby, trusted access point after detecting an IEEE 802.11v frame exchange between the rogue access point and the rogue station.

9. The method of claim 1, wherein the spoofed BTM-REQ Action frame comprises an unsolicited BTM-REQ Action frame transmitted by the nearby, trusted access point without first receiving a BTM Query frame from the rogue station.

10. The method of claim 1, wherein the Wi-Fi controller selects the nearby, trusted access point based at least in part on a scan report identifying the nearby, trusted access point as being in a vicinity of the rogue access point.

11. The method of claim 10, wherein the scan report comprises received signal strength information associated with one or more detected wireless devices.

12. The method of claim 1, wherein the spoofed BTM-REQ Action frame is transmitted on an operating channel of the rogue access point.

13. The method of claim 1, wherein the spoofed BTM-REQ Action frame comprises a BSS Transition Candidate Preference subelement that identifies the rogue BSSID with a preference value of zero.

14. The method of claim 1, wherein the spoofed BTM-REQ Action frame comprises a BSS Transition Candidate Preference subelement that identifies the trusted BSSID with a preference value of 255.

15. The method of claim 1, wherein the Wi-Fi controller causes a WIDS radio of the nearby, trusted access point to transmit the spoofed BTM-REQ Action frame while the WIDS radio is operating in a dedicated monitor mode.

16. The method of claim 1, wherein the subsequent station scan reports indicate that the rogue station has disconnected from the rogue BSSID or has ceased data traffic through the rogue access point.

17. The method of claim 1, wherein disrupting the connection to the rogue access point for the second rogue station comprises causing the nearby, trusted access point to transmit a spoofed IEEE 802.11k Neighbor Report Response frame identifying the rogue BSSID with the lowest value and identifying the trusted BSSID with the highest value.

18. A non-transitory computer-readable medium in a Wi-Fi controller on a data communication network, for disrupting connections between rouge access points and rogue stations operating with spoofed Basic Service Set (BSS) Transition Management Request (BTM-REQ frame) Action frames, the method comprising:

receiving, at the Wi-Fi controller, AP scan reports and station scan reports from one or more access points;

identifying a rogue access point from the access point scan reports and a rogue station from the station scan reports, wherein the rogue station and the rogue access point are compatible with IEEE 802.11v;

disrupting the rogue station connection to the rogue access point by notifying a nearby, trusted access point to transmit a spoofed BTM-REQ Action frame, having a Preference field value for a rogue BSSID set to a lowest value under a Subelement: BSS Transition Candidate Preference field, and having a Preference field value for a trusted BSSID set to a highest value, wherein the Disassociation Imminent field value is set to 1 indicative of upcoming disconnection, and wherein the nearby trusted access point is compatible with IEEE 802.11v; and detecting disruption of the connection between the rogue station and the rogue BSSID from subsequent station scan reports;

wherein a second rogue station does not support IEEE 802.11v, disrupting the connection to the rogue access point by notifying a nearby, trusted access point to transmit a spoofed Action frame, wherein a Preference field value is set to a lowest value for a rogue BSSID under Subelement: BSS Transition Candidate Preference, wherein a Preference field value for a trusted BSSID is set to a highest value.

19. A Wi-Fi controller on a data communication network, for disrupting connections between rouge access points and rogue stations operating with spoofed Basic Service Set (BSS) Transition Management Request (BTM-REQ frame) Action frames, the Wi-Fi controller comprising:

a processor;

a network interface communicatively coupled to the processor and to a data communication network; and a memory, communicatively coupled to the processor and storing:

an access point module to receive AP scan reports and station scan reports from one or more access points;

a rogue device detector to identify a rogue access point from the access point scan reports and a rogue station from the station scan reports, wherein the rogue station and the rogue access point are compatible with IEEE 802.11v; and a rogue device disruptor to disrupt the rogue station connection to the rogue access point by notifying a nearby, trusted access point to transmit a spoofed BTM-REQ Action frame, having a Preference field value for a rogue BSSID set to a lowest value under a Subelement: BSS Transition Candidate Preference field, and having a Preference field value for a trusted BSSID set to a highest value, wherein the Disassociation Imminent field value is set to 1 indicative of upcoming disconnection, and wherein the nearby trusted access point is compatible with IEEE 802.11v, wherein the rogue device detector identifies disruption of the connection between the rogue station and the rogue BSSID from subsequent station scan reports; and wherein a second rogue station does not support IEEE 802.11v, disrupting the connection to the rogue access point by notifying a nearby, trusted access point to transmit a spoofed Action frame, wherein a Preference field value is set to a lowest value for a rogue BSSID under Subelement: BSS Transition Candidate Preference, wherein a Preference field value for a trusted BSSID is set to a highest value.

20. The Wi-Fi controller of claim 19, wherein the spoofed BTM-REQ Action frame comprises a solicited BTM-REQ Action frame transmitted by the nearby, trusted access point after detecting an IEEE 802.11v frame exchange between the rogue access point and the rogue station.

* * * * *